United States Patent [19]
Silgailis et al.

[11] Patent Number: 5,256,211
[45] Date of Patent: Oct. 26, 1993

[54] RAPID ANNEALING METHOD USING SHORTED SECONDARY TECHNIQUE

[75] Inventors: John Silgailis, Cedar Grove; Davidson M. Nathasingh, Hackettstown; Carl H. Smith, Chatham, all of N.J.

[73] Assignee: Allied Signal, Morris Township, Morris County, Del.

[21] Appl. No.: 810,595

[22] Filed: Dec. 19, 1991

[51] Int. Cl.$^5$ .................. C21D 8/12; H01F 41/02
[52] U.S. Cl. .................. 148/108; 148/121; 148/304; 219/10.41; 219/10.57; 219/10.75
[58] Field of Search .......... 148/108, 121, 304; 29/602, 605; 219/10.41, 10.43, 10.57, 10.75, 10.79

[56] References Cited

U.S. PATENT DOCUMENTS 4,726,855  2/1988  Tsutsui et al. .................. 148/108

FOREIGN PATENT DOCUMENTS 059812   3/1986  Japan .
147816   7/1986  Japan .
174612   8/1986  Japan .
292906  12/1986  Japan .
63-72823 4/1988  Japan .................. 148/108

Primary Examiner—Richard O. Dean
Assistant Examiner—Sikyin Ip
Attorney, Agent, or Firm—Melanie L. Brown; Gerhard Fuchs; Karen A. Harding

[57] ABSTRACT

The present invention is directed to a process for rapidly field annealing ferromagnetic cores and the cores produced thereby. A current is applied across a magnetizing source associated with a magnetizing core which induces a flux/voltage in the ferromagnetic core which is disposed about a leg of the magnetizing core. The flux/voltage in the second core induces a current in the second core which in turn induces a field in, and transverse to the width direction of, the ferromagnetic core. A second field may e applied to the ferromagnetic core during cooling. The cores produced display low core loss and either sheared over or square loop properties which are suitable for current and distribution type transformers respectively.

13 Claims, 3 Drawing Sheets

RAPID ANNEALING METHOD USING SHORTED SECONDARY TECHNIQUE

SUMMARY OF THE INVENTION

The present invention is directed to a process for rapidly field annealing ferromagnetic cores and the cores produced thereby. The process comprises resistance annealing a ferromagnetic core by positioning said core around the leg of a magnetizing core, so that the ferromagnetic core forms a shorted secondary turn; applying current to said magnetizing core via a magnetizing source such that a flux/voltage is induced in the magnetizing core which, in turn, induces a current in the ferromagnetic core; maintaining said flux/voltage until the desired annealing temperature is achieved and for a time sufficient to alter the magnetic properties of the ferromagnetic core; and cooling said ferromagnetic core. Optionally, the ferromagnetic core may be cooled in the presence of an applied field. The resulting cores display either sheared over or square B-H loops and are useful for zero and metering type current transformers, and distribution transformers, respectively.

BACKGROUND OF THE INVENTION

Current transformers especially zero-type transformers such as large ground fault interrupters (GFI), utilize cores exhibiting a rounded (sheared over) B-H loop along with a high saturation induction. Distribution transformers require cores having a square B-H loop and low core loss and exciting power. Cores for both types of transformers are typically large. Distribution and zero-type current transformers range from 1 to 100 kg, and have an OD of up to about 600 mm.

It is necessary to field anneal the cores to achieve the B-H loop shapes which are required for these applications. For small cores (less than about 100 g) permanent magnets may be used. Presently, only magnets which are made from AlNiCo or Sm/Co can withstand the furnace temperatures necessary for annealing. Such magnets are extremely difficult to make and magnets with flat faces which are larger than about 4 inches (10 cm) are not known to be available. Accordingly, for cores with inner and outer diameters (ID and OD respectively) which are larger than about 4 inches (10 cm), the use of permanent magnets is not practical. Moreover, large cores are conventionally annealed in large furnaces under protective atmospheres. Annealing under such conditions is very costly because large cores can take as long as eight hours or more to anneal.

Resistance annealing an amorphous alloy wound core by flowing a current through a coil disposed about a leg of the core (thereby generating heat due to energy loss in the core) is disclosed in Japanese application Nos. 85/161,497 and 85/135,301, both filed on Jun. 21, 1985. Similarly, Japanese application No. 84/181,850 discloses the production of an iron core for transformers by making a core from a magnetic amorphous alloy plate, winding coils around the core and exciting the core to anneal.

Accordingly, there remains a continuing need for a practical method for field annealing large cores particularly current transformer cores, which does not require the use of a protective atmosphere, long annealing times, or the development of new magnets.

DETAILED DESCRIPTION OF THE INVENTION

The present invention provides a process for field annealing large cores, such as large GFI cores. While cores of any size may be annealed according to the present invention, large cores, and particularly those which are larger than about 1 kg and have OD of greater than about 600 mm, are benefitted most.

Cores which may be resistance annealed according to the present invention may be made from any ferromagnetic material, such as grain oriented electrical steel and are preferably made from ferromagnetic amorphous alloy ribbon, amorphous alloy ribbon containing crystals, or nanocrystalline particles, Co-based alloys and Fe-based alloys. More particularly, Fe, Fe-Ni- and Fe-Co-based ferromagnetic alloys are most frequently used for transformer core applications, and are thus most preferred.

Figure 1:
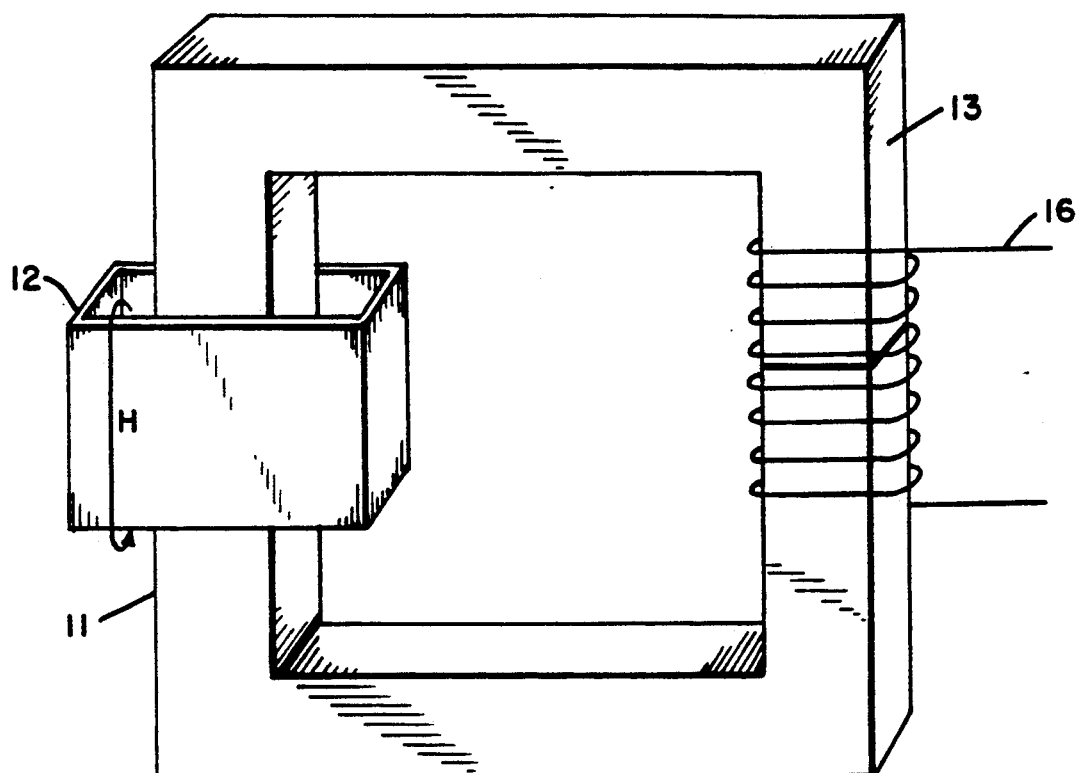
FIG. 1 shows a preferred embodiment for resistance annealing cores where a sheared over B-H loop shape is desired.

The ferromagnetic core to be annealed (second core) 12 is placed around a leg of a magnetizing core 10 as shown in FIG. 1. The second core 12 may have any practical design or configuration such as rectangular or toroidal, and can be a stacked or wound core. The magnetizing core 10 may be made from any suitable material such as transformer grade electrical steel, or amorphous alloys such as Fe, Fe-Ni or Fe-Co based alloys and can similarly be of any suitable design or configuration. In the case of magnetizing cores of a wound configuration formed from amorphous metals only a single cut is required as the amorphous metal is flexible and can be easily opened to receive the second core. The magnetizing core 10 is usually cut so that the second core 12 may be positioned around a "leg" 11 of the magnetizing core. Alternatively, the second core 12 may be cut and positioned around the magnetizing core 10. However, when the second core is cut, the cut ends must cooperate such that the second core is capable of conducting the induced current.

A magnetizing source 16 is associated with the magnetizing core 10 to induce flux/voltage in the magnetizing core. The magnetizing source 16 is conveniently conductive wire such as copper wire wrapped around a leg 13 of the magnetizing core preferably opposite the second core. It is well understood that any suitable conductor other than a conductive wire could be utilized. When the magnetizing source is a conductive wire wrapped around a leg of the core, the number of turns, N, must be sufficient to induce flux/voltage necessary to heat the second core to the appropriate annealing temperature. The number of turns necessary to induce sufficient flux/voltage in the magnetizing core may be calculated from Faraday's law of electromagnetic induction:

$$N \geq \frac{V_{rms}}{4.44 \, B_{max} \, Af}$$

where N is the number of turns, $V_{rms}$ is the maximum applied voltage (root mean square) applied to the magnetizing source (in volts) $B_{max}$ is the maximum induction through the magnetizing core (in tesla), A is the cross-sectional area (in square meters) of the magnetizing core, and f is the frequency (in hertz).

An AC current supplied from any suitable current generating source (not shown) is passed through the magnetizing source 16, thereby inducing magnetic flux changes in the magnetizing core 10 which, in turn induce a flux/voltage in the second core 12. The second core 12 acts as a shorted secondary coil and the flux/voltage causes a current to flow in this shorted turn. The current flowing in the second core 12 heats the second core. The amount of current required to the heat the second core may be calculated according to the formula:

$$\epsilon = I^2 R t,$$

where $\epsilon$ is thermal energy required to raise the temperature in the core to be annealed from a first temperature to an elevated second temperature, i is current in the second core, R is the resistance of the second core, and t is the time necessary to heat the second core to the desired annealing temperature.

The second core is heated in accordance with an appropriate regimen for the alloy employed, being held at temperature(s) for time(s) sufficient to alter the magnetic properties of the core in the manner desired. Annealing regimens, i.e. temperatures, times and heat rates are well known in the art. The present invention, however, offers an advantage, among many others, of a remarkably high heating rate which significantly reduces the time of the annealing cycle. For example, a core made from amorphous alloy ribbon having the composition $Fe_{79.7}B_{10.9}Si_{9.4}$ typically requires an annealing temperature of between about 320° C. and about 420° C. and is usually brought to temperature at a rate of about 6° C./min. The temperature is then maintained for between about 1 and 2 hours. Utilizing the process of the present invention the annealing temperature can be achieved in as little as about 10 minutes and the annealing time can be as short as 5 minutes.

As current is induced in the second core 12, a field transverse to the ribbon direction of the core is generated in the second core. The direction of travel of the flux lines in the second core is illustrated by the arrow H in FIG. 1. In addition to the induced current, other smaller currents flow between or across individual laminations. These smaller currents combine forming a circumferential field which "competes" with the transverse field, creating a composite field which is substantially, but not entirely, transverse.

The effects of the circumferential field may be controlled (e.g., minimized) by fully insulating each lamination from an adjacent lamination with an appropriate insulting material such as polyimide tape, a coating of $SiO_2$ or other refractory materials, or any other nonmagnetic material. Insulating the laminations also results in more consistent resistances and fields across the core which insures a more uniform annealing temperature across the core. An insulated core must be provided with a conducting means such as a shunt (not shown) extending between the inside turn and the outside turn in order to provide a continuous path for the induced current.

After the second core has been heated to the desired temperature and held at temperature for the required time, the current through the magnetizing source 16 is interrupted or its intensity decreased incrementally, to enable the core to cool to a desired temperature.

The second core optionally, may be cooled under the influence of a magnetic field (applied via any method known in the art) or in the absence of an applied field. For example, a transverse field may be readily applied during cooling using metal/resin permanent magnets which are commonly available in any size. Alternatively, a circumferential field may be applied in a manner as described hereinbelow.

The basic process of the present invention induces magnetic anisotropy, results in alignment of the magnetic domains of the alloy ribbon along the direction of the induced field. Cores which are annealed accordingly display a sheared-over hysteresis loop, such as the loop of FIG. 3, and magnetic properties which make the annealed cores particularly useful for current transformers, particularly, zero-type transformers. As the effect of the circumferential field is reduced the resulting B-H loop shifts more toward the horizontal axis. Cores annealed by the basic process also display low core loss, but relatively high exciting power.

Figure 2:
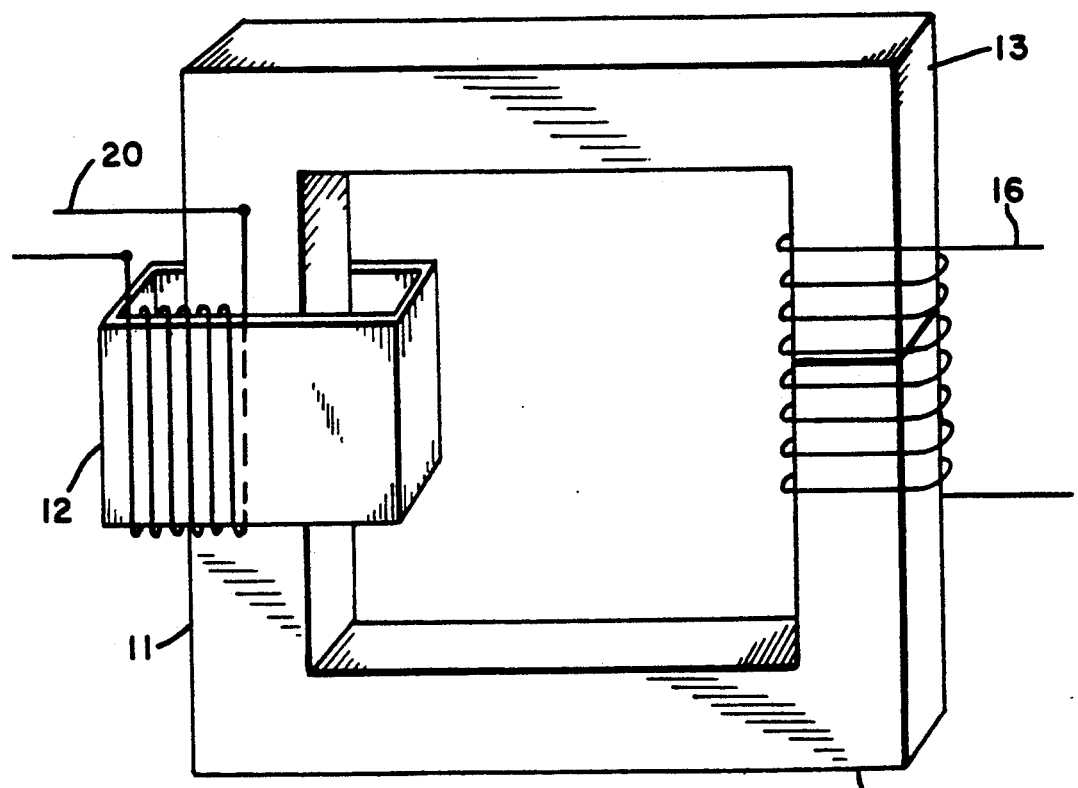
FIG. 2 shows a preferred embodiment for resistance annealing cores where a square B-H loop shape is desired.

An alternate embodiment, shown in FIG. 2, produces cores with generally square B-H loops and low exciting power values, which are particularly useful for distribution transformer cores. Elements common to FIGS. 1 and 2 share the same reference numerals. In this embodiment a second magnetizing source, such as conductive windings 20, is associated with (wound around) a leg of the second core 12.

The process utilizing the embodiment illustrated in FIG. 2 is as follows. Initially, the second core is annealed as described above. After the annealing step, the intensity of the current in the magnetizing source 16 is controlled such that the temperature of the second core 12 is maintained at or above the Curie temperature of the alloy of the second core. The current in the magnetizing source 16 is then interrupted and a magnetic field is applied by a second magnetizing source 20. Preferably a DC or AC circumferential field (most preferably DC) is applied by the second magnetizing source 20 to the second core 12. The circumferential field is of an intensity not exceeding about 8000 A/m (100 Oe) and preferably is between about 800 A/m (10 Oe) and about 2000 A/m (25 Oe) so that the second core cools. The second core is cooled through its Curie temperature under the influence of the circumferential field to reintroduce domain alignment along the longitudinal axis of the alloy ribbon. The field can be controlled by suitable means. Further, the degree of domain realignment may be controlled by controlling the cooling rate of the second core. Cores annealed according to this embodiment display a generally square B-H loops and exhibit low core loss and exciting power.

EXAMPLE 1

A 5.18 kg core (second core) wound from alloy having the composition $Fe_{79.7}B_{10.9}Si_{9.4}$ having dimensions OD=156 mm, ID=114 mm and height 101 mm was placed around one leg of a Si-Fe C-core (2 inch by 4 inch cross sectional area) (magnetizing core) as shown in FIG. 1. AwG 15 wire was wound around the opposite leg of the C-core to form a 60 turn primary coil (magnetizing source). Three thermocouples were positioned on the ID, OD and between two laminations of the second core. The second core was insulated with fiberglass to protect the magnetizing core from the heat generated in the second core. Voltage of 0.72V/t produced current of 20 amps which was passed through the primary coil, and after 50 minutes the temperature of the second core was in the range of 330° C. to 370° C. The second core was cooled in air at about half the rate of the heating step by incrementally reducing the current in the magnetizing source. No external field was applied during cooling.

Table 1 summarizes the core loss and exciting power of the resistance annealed cores at different induction levels.

TABLE 1

| Induction B (T) | 1.2 | 1.3 | 1.4 | 1.45 | 1.50 |
|---|---|---|---|---|---|
| core loss W/kg | .208 | .234 | .264 | .282 | .301 |
| exciting power VA/kg | 1.60 | 2.59 | 4.38 | 5.92 | 8.42 |

The low core loss and high exciting power displayed indicates that at least a partial transverse field anneal was achieved.

EXAMPLE 2

Figure 3:
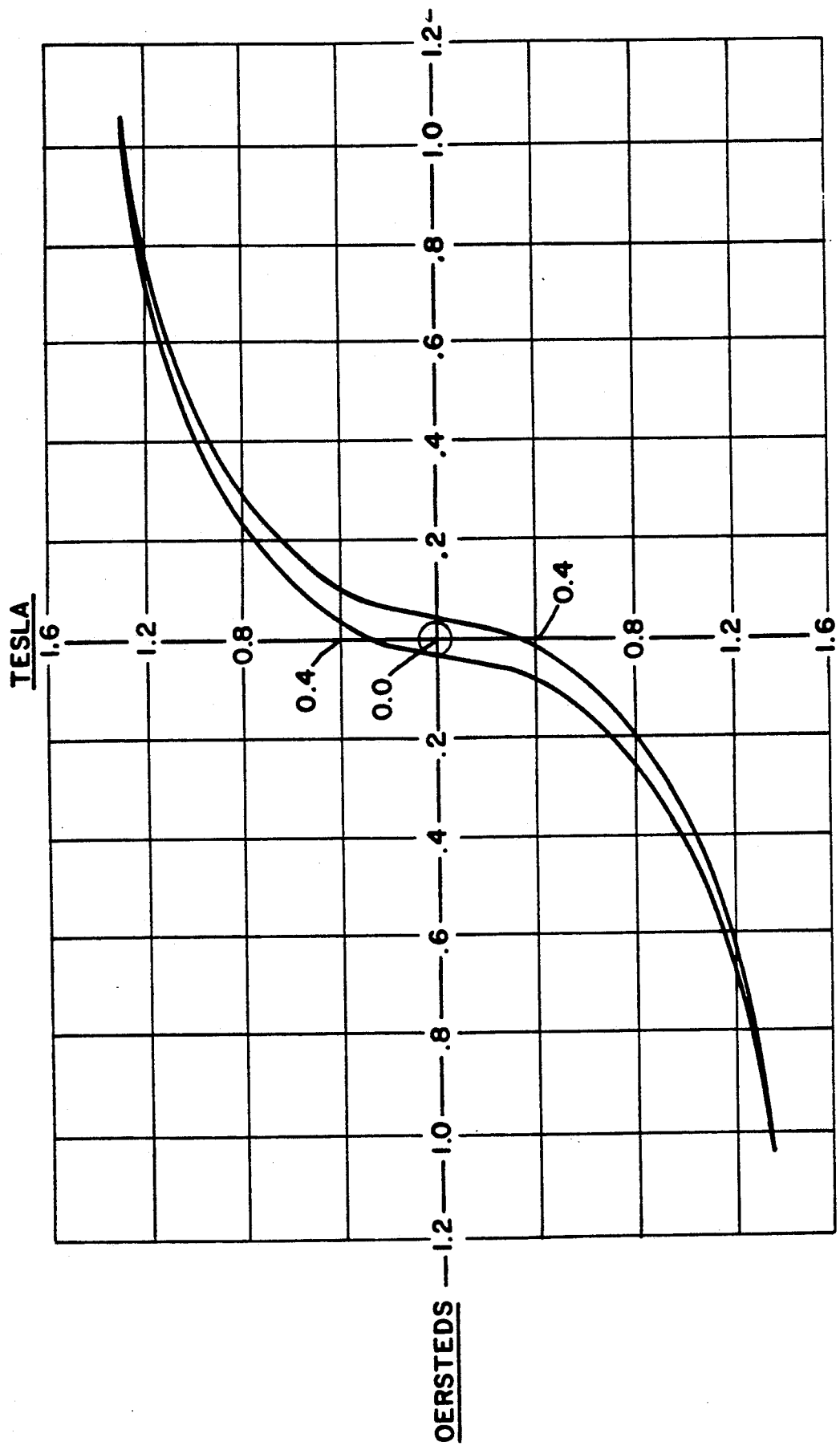
FIG. 3 shows the B-H loop for a transverse field resistance annealed core.

A 2.74 kg core (second core) was wound using 128 mm wide alloy having the composition $Fe_{79.7}B_{10.9}Si_{9.4}$. The core was placed on one leg of a magnetizing core having a 6.07 cm$^2$ cross-sectional area, forming a single turn secondary coil. The primary coil (magnetizing source) was 100 turns of AWG 15. Currents of about 10-20 amps were passed through the magnetizing source and temperatures in the range of 365° C. to 415° C. were reached in about second core in about 20 minutes. The temperatures, although not uniform, were still within a range necessary to achieve optimum annealing. The core was cooled in steps, at half intensity of the magnetizing source for 20 minutes, and then at quarter intensity until the core returned to room temperature in about 1 hour. No external field was applied during cooling. At an induction (B) of 1.35 T, the annealed core displayed a core loss of 0.193W/kg and a exciting power of 2.44 VA/kg. The annealed core also displayed a $B_1$ of 1.28 T, a $B_r$ of 0.36 T and an initial permeability of 8800 at 35 gauss and 60 Hz. FIG. 3 shows the DC B-H loop trace for the resistance annealed core. The loop is clearly sheared over. Table 2, below, compares the initial permeability of the resistance annealed core to prior art Si-Fe cores.

TABLE 2

| INITIAL PERMEABILITY AT 60 Hz | | | | | | |
|---|---|---|---|---|---|---|
| INDUCTION (G) | 5 | 10 | 35 | 100 | 500 | 1000 |
| Si—Fe | 1200 | 2200 | 5500 | 9800 | 16000 | 18000 |
| Fe-base amorp | 2200 | 3500 | 8800 | 20000 | 47000 | 73000 |

The resulting high initial permeability and low $B_r$ characteristics are ideal for current transformer applications.

EXAMPLE 3

An amorphous metal distributed gap transformer core was used as the magnetizing core. A 100 turn primary coil was used as the magnetizing source. A second core having the dimensions: ID=197 mm, OD=207 mm, 2.63 k and the same composition as in the previous examples was placed on the leg of the magnetizing core opposite the primary coil. Thermocouples were placed at the ID, the OD and between two laminations of the second core. Second conducting windings were wrapped around the second core. The second core was completely insulated to protect the magnetizing core. Currents of about 8 amps were passed through the magnetizing source. The second core was heated to about 428° C. (measured by the thermocouple between the laminating of the record core) in about 13 minutes. The current through the magnetizing source was turned off and 20 amps of DC current were passed through the second conducting windings during cooling of the second core.

Figure 4:
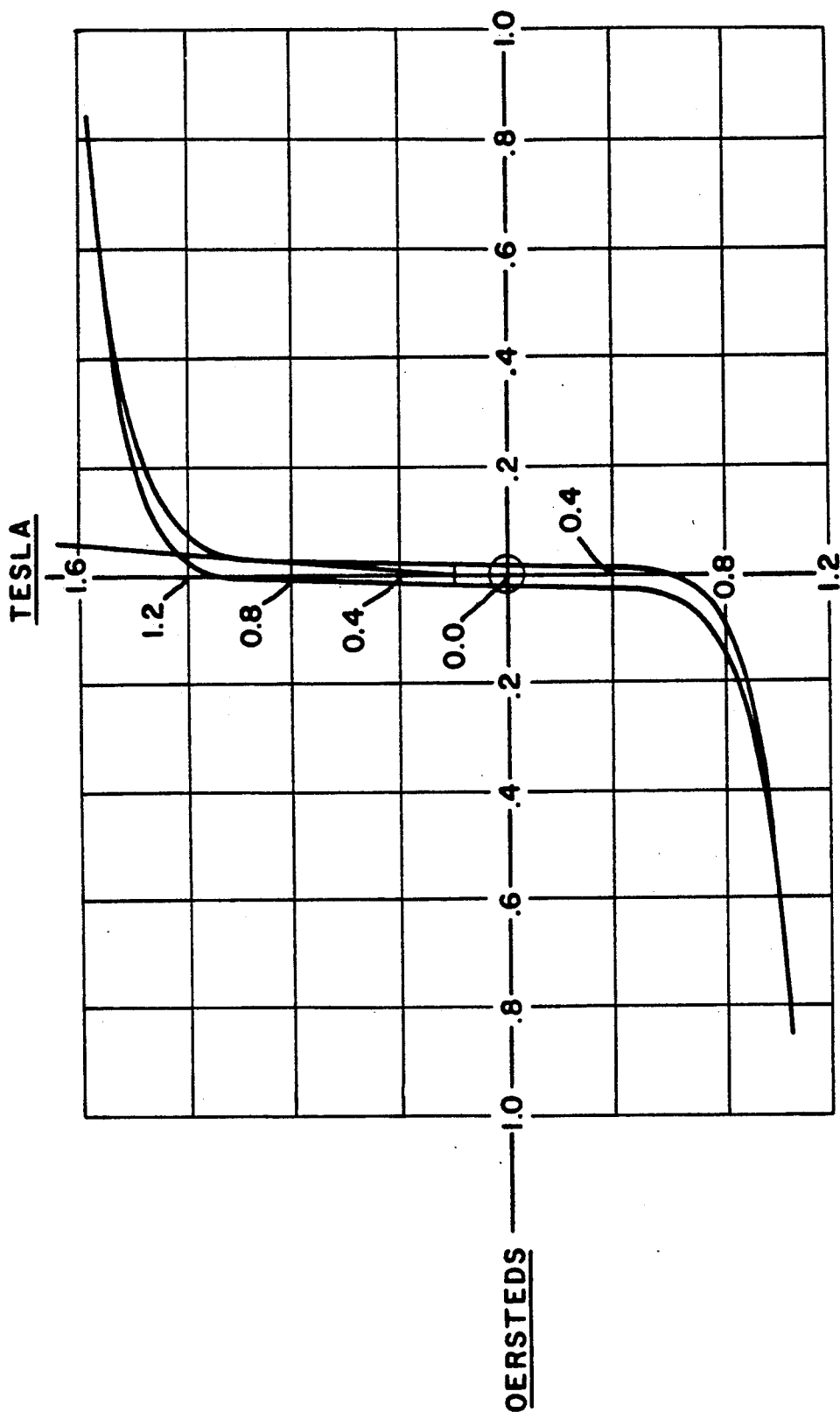
FIG. 4 shows the B-H loop for a core which was transverse field resistance annealed and then cooled in a circumferential field.

The core loss and exciting power values for the annealed core were 0.20W/kg and 1.74 va/kg respectively at 1.35 T. The DC loop (FIG. 4) was generally square, exhibiting a $B_r$ of 0.8 T (compared to a $B_r$ value of 0.36 T for a core to which no circumferential field was applied during cooling). It is believed that with further optimization that even higher $B_r$ values are obtained.

The true scope and spirit of the invention is to be determined by the scope of the appended claims and should not be limited by the foregoing examples.

We claim:
1. A process comprising the steps of;
    applying alternating current through a magnetizing source to a magnetizing core sufficient to heat a second core which is ferromagnetic and which is disposed about a leg of said magnetizing core to form a signal turn secondary coil;
    maintaining said current until a desired temperature is achieved in the second core and for a time sufficient to alter the magnetic properties of said second core; and
    cooling said second core and applying a magnetic field via a second magnetizing source to said second core during said cooling step.
2. The process of claim 1 wherein said altered magnetic property is an induced magnetic anisotropy.
3. The process of claim 2 further comprising the steps of:
    heating said heated second amorphous alloy core to a temperature above a curie temperature of said amorphous alloy, and for a time sufficient to decouple said induced anisotropy; and
    applying a field to said second core during said cooling step.
4. The process of claim 3 wherein said field is applied circumferentially.
5. The process of claim 4 wherein said field is either a DC or AC field.
6. The process of claim 4 wherein said field is a DC field.
7. A transverse field annealed core having an outer diameter greater than about 10 cm, and produced according to the process of claim 1.
8. The process of claim 1 wherein said second core comprises at least partially amorphous alloy ribbon.
9. The process of claim 8 wherein said second core is made of $Fe_{79.7}B_{10.9}Si_{9.4}$.

10. The process of claim 8 wherein said ribbon comprises nanocrystals.

11. The process of claim 8 wherein said second core comprises a plurality of laminations each insulated from the other and conducing means establishing a continuous conductive path through said laminations.

12. The process of claim 1 wherein said cooling step is accomplished by interrupting said current applied through said magnetizing source.

13. The process of claim 1 wherein said cooling step is accomplished by incrementally reducing said current applied through said magnetizing source.

* * * * *